United States Patent
Lemmers, Jr. et al.

(10) Patent No.: US 9,874,245 B2
(45) Date of Patent: Jan. 23, 2018

(54) BEARING LINERS FOR USE WITHIN LIGHT ALLOY HOUSINGS

(71) Applicant: Hamilton Sundstrand Corporation, Charlotte, NC (US)

(72) Inventors: Glenn C. Lemmers, Jr., Loves Park, IL (US); Andrew P. Grosskopf, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 92 days.

(21) Appl. No.: 14/961,019

(22) Filed: Dec. 7, 2015

(65) Prior Publication Data
US 2017/0159714 A1  Jun. 8, 2017

(51) Int. Cl.
F16C 35/04    (2006.01)
F16C 33/62    (2006.01)
F16C 35/077   (2006.01)
F16C 19/06    (2006.01)
F16C 19/52    (2006.01)

(52) U.S. Cl.
CPC ........... F16C 35/042 (2013.01); F16C 33/62 (2013.01); F16C 35/077 (2013.01); *F16C 19/06* (2013.01); *F16C 19/525* (2013.01); *F16C 2202/22* (2013.01); *F16C 2204/20* (2013.01); *F16C 2204/26* (2013.01); *F16C 2204/52* (2013.01); *F16C 2204/60* (2013.01); *F16C 2226/14* (2013.01); *F16C 2380/28* (2013.01)

(58) Field of Classification Search
CPC ........ F16C 19/525; F16C 33/62; F16C 35/07; F16C 35/077; F16C 2202/22
See application file for complete search history.

(56) References Cited

U.S. PATENT DOCUMENTS

| | | | | |
|---|---|---|---|---|
| 3,311,431 A | * | 3/1967 | Hilliard | F16C 17/22 |
| | | | | 384/493 |
| 4,545,064 A | | 10/1985 | Klostermann | |
| 5,073,039 A | | 12/1991 | Shervington | |
| 5,538,349 A | * | 7/1996 | Morris | F16C 35/077 |
| | | | | 29/898.07 |
| 6,250,815 B1 | * | 6/2001 | Picone | F16C 19/525 |
| | | | | 384/557 |

(Continued)

FOREIGN PATENT DOCUMENTS

| | | | | | |
|---|---|---|---|---|---|
| GB | 1023637 A | * | 3/1966 | ............ | F16C 19/548 |
| JP | 2008045622 A | | 2/2008 | | |
| WO | WO 9005856 A1 | * | 5/1990 | ............ | F16C 19/525 |

OTHER PUBLICATIONS

EP SR Issued Jun. 7, 2017 in U380640EP, EP Patent Application No. 16202702.3, 6 pages.

*Primary Examiner* — Phillip A Johnson
(74) *Attorney, Agent, or Firm* — Cantor Colburn LLP

(57) ABSTRACT

A device with a rotating element includes a housing body formed from a light alloy, wherein the housing body has a housing body thermal expansion coefficient, a bearing liner formed from a liner material disposed within the housing body, wherein the bearing liner has a bearing liner thermal expansion coefficient, and a bearing to support the rotating element with an outer race, wherein the bearing has a bearing thermal expansion coefficient, the outer race is press fit within the bearing liner, and the bearing liner thermal expansion coefficient is lower than the bearing thermal expansion coefficient.

15 Claims, 2 Drawing Sheets

(56) References Cited

U.S. PATENT DOCUMENTS

| | | |
|---|---|---|
| 6,295,338 B1 | 9/2001 | Kuzniar et al. |
| 2002/0125778 A1 | 9/2002 | Obara |
| 2014/0219598 A1* | 8/2014 | Grosskopf ............. F16C 23/08 384/495 |
| 2016/0236510 A1* | 8/2016 | Beck ................... B60B 27/0078 |

* cited by examiner

BEARING LINERS FOR USE WITHIN LIGHT ALLOY HOUSINGS

BACKGROUND

The subject matter disclosed herein relates to bearing liners, and more particularly, to a bearing liner for Integrated Drive Generators (IDG) to maintain a bearing internal clearance.

Bearings are used to support rotating devices such as generators within a housing of the rotating device. Bearings disposed within the housing of the rotating device may require a specified bearing clearance range for optimal bearing performance and to maximize bearing operating life. Often, bearings and the housing are formed of dissimilar materials which may expand at different rates across a temperature range and may, therefore, not maintain a desired bearing clearance at various temperatures.

BRIEF SUMMARY

According to an embodiment, a device with a rotating element includes a housing body formed from a light alloy, wherein the housing body has a housing body thermal expansion coefficient, a bearing liner formed from a liner material disposed within the housing body, wherein the bearing liner has a bearing liner thermal expansion coefficient, and a bearing to support the rotating element with an outer race, wherein the bearing has a bearing thermal expansion coefficient, the outer race is press fit within the bearing liner, and the bearing liner thermal expansion coefficient is lower than the bearing thermal expansion coefficient.

According to an embodiment, an integrated drive generator includes a rotating shaft, a housing body formed from a light alloy, wherein the housing body has a housing body thermal expansion coefficient, a bearing liner formed from a liner material disposed within the housing body, wherein the bearing liner has a bearing liner thermal expansion coefficient, a bearing with an outer race, the bearing to support the rotating shaft, wherein the bearing has a bearing thermal expansion coefficient, the outer race is press fit within the bearing liner, and the bearing liner thermal expansion coefficient is lower than the bearing thermal expansion coefficient.

Technical function of the embodiments described above includes that the bearing liner thermal expansion coefficient is lower than the bearing thermal expansion coefficient.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
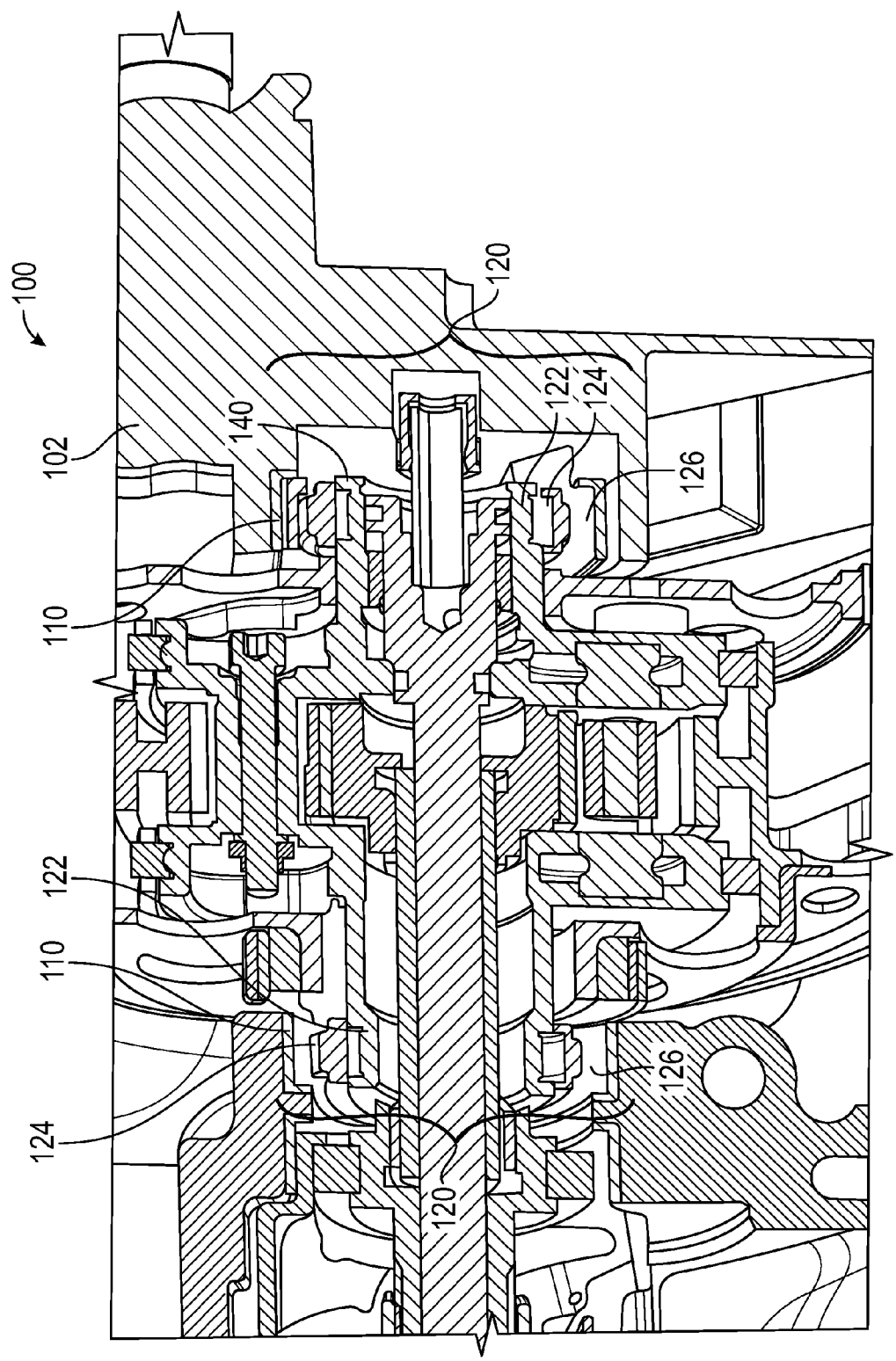
FIG. 1 is a cross sectional view of one embodiment of an IDG.

Referring now to the drawings, FIG. 1 shows a portion of an IDG 100. In the illustrated embodiment, the IDG 100 includes a housing 102, a rotating shaft 140, a bearing 120, and a bearing liner 110. In the illustrated embodiment, the IDG 100 is suitable for use with an aircraft. In certain embodiments, the IDG 100 can be a variable frequency generator, a hydro-mechanical device, carrier shaft, etc. In the illustrated embodiment, the IDG 100 can be utilized to generate electricity within an aircraft.

In the illustrated embodiment, the IDG 100 is disposed within a housing 102. In the illustrated embodiment, the housing 102 supports rotating components such as the rotating carrier shaft 140 of a differential. In other embodiments, the rotating component could also be a generator shaft, an idler gear shaft or some other rotating component. In certain embodiments, the housing 102 is formed from a light alloy to minimize weight of the IDG 100. Advantageously, the use of a light alloy allows the IDG 100 to meet aircraft weight requirements and optimize aircraft performance. In the illustrated embodiment, light alloys can include alloys formed from aluminum, magnesium and other suitable metals. Typically, light alloys and therefore housing 102 can have a high thermal expansion coefficient. For example, magnesium has a coefficient of thermal expansion of $25*10^{-6}$ meters/(meters*Kelvin) and aluminum has a thermal expansion of $22.2*10^{-6}$ meters/(meters*Kelvin).

In the illustrated embodiment, the rotating shaft 140 is a rotating carrier shaft of the differential disposed within the housing 102. The rotating shaft 140 may transmit power from one component to another within the IDG 100. In the illustrated embodiment, the rotating shaft 140 is supported during rotation by the bearing 120. During operation, heat generated by the IDG 100 can increase IDG 100 temperature above surrounding ambient temperatures.

Figure 2:
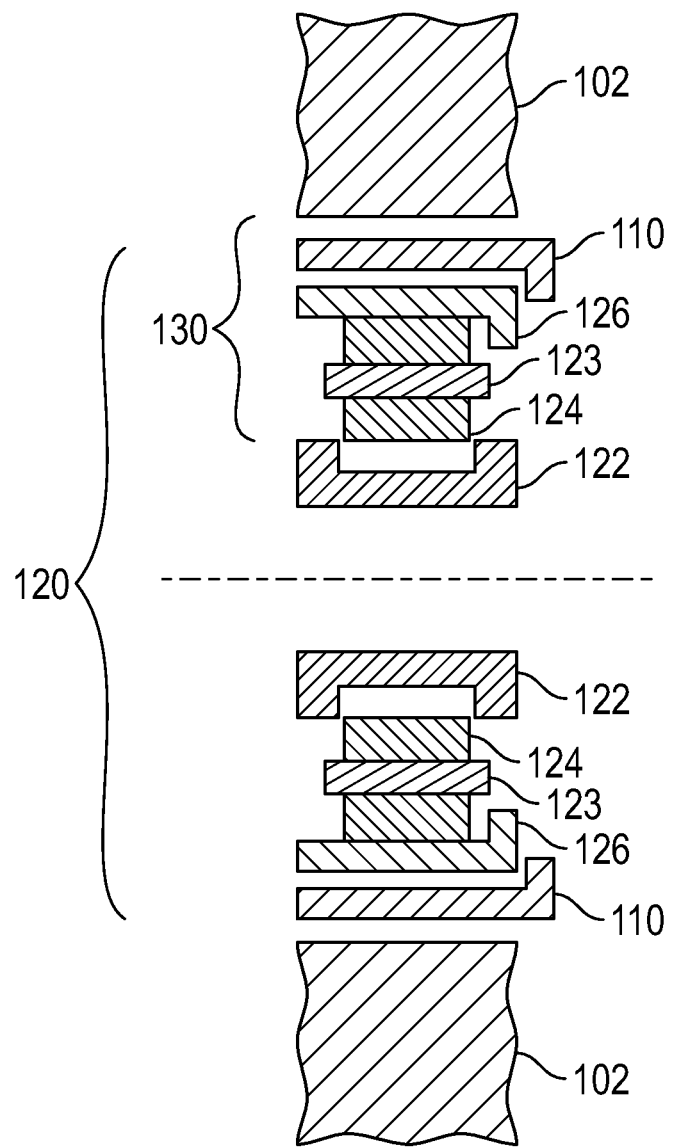
FIG. 2 is a schematic view of one embodiment of a bearing and bearing liner for use with the IDG of FIG. 1.

Referring to FIGS. 1 and 2 the bearing 120 is shown. In the illustrated embodiment the bearing 120 axially and radially supports the rotating shaft 140. In the illustrated embodiment, the bearing 120 includes an outer race 126, and inner race 122 and rollers 124. In the illustrated embodiment, the bearing 120 and the components thereof can be formed from ferrous materials such as steels. In certain embodiments, the ferrous material can be heat treated to achieve a desired hardness. Advantageously, the bearing 120 is formed from such a ferrous material to provide desirable operational and wear characteristics. In the illustrated embodiment, the bearing 120 is formed from steel, wherein the steel bearing 120 can have a lower thermal expansion coefficient than light alloys, wherein the thermal expansion of steel ranges from $9.9*10^{-6}$ meters/(meters*Kelvin) to $17.3*10^{-6}$ meters/(meters*Kelvin). Therefore, in the illustrated embodiment, the bearing 120 may expand less across a given temperature range compare to the housing 102.

In the illustrated embodiment, the inner race 122 interfaces with the rotating shaft 140. In certain embodiments, the inner race 122 can be integrated with the rotating shaft 140. In other embodiments, the inner race 122 can be separately formed from the rotating shaft 140. In certain embodiments, the inner race 122 and the rollers 124 can both contact the rotating shaft 140 to facilitate the rotation and support of the rotating shaft 140. In the illustrated embodiment, the inner race 122 is formed from steel to provide desirable operational and wear characteristics.

In the illustrated embodiment, the rollers 124 are cylindrical rollers to facilitate the support and rotation of the inner race 122 and the rotating shaft 140 relative to the outer race 126. In certain embodiments, the rollers 124 can be spherical ball bearings retained between the inner race 122 and the outer race 126. In the illustrated embodiment, the rollers 124 are formed from steel to provide desirable operational and wear characteristics. In certain embodiments, a bearing retainer 123 can be provided to retain the rollers 124 and maintain desired a roller spacing between the rollers 124.

In the illustrated embodiment, the outer race 126 is disposed around the rollers 124. In the illustrated embodiment, the outer race 126 is disposed within the housing 102 to transmit the axial and radial loads experienced by the bearing 120 to the housing 102. In the illustrated embodiment, the outer race 126 and the bearing 120 generally are press fit into a bearing liner 110 which is disposed within the housing 102 to affix the bearing 120 within. In the illustrated embodiment, the outer race 126 is formed from steel to provide desirable operational and wear characteristics.

In the illustrated embodiment, the bearing 120 is press fit into the bearing liner 110. In the illustrated embodiment, the bearing liner 110 allows for a desired interface between the bearing 120 and the housing 102 while preventing undesired wear or damage to the housing 102. In the illustrated embodiment, the bearing liner 110 is cylindrically shaped with a retaining lip to allow for a desired location of the bearing 120 within the bearing liner 110. In the illustrated embodiment, the bearing 120 can be press fit into the bearing liner 110 before the bearing liner 110 is disposed within the housing 102 or after the bearing liner 110 is disposed within the housing.

In the illustrated embodiment, the material of the bearing liner 110 is selected to maintain a bearing internal clearance 130 across an operational temperature range. In the illustrated embodiment, the bearing liner 110 is selected to provide a lower thermal expansion coefficient than both the bearing 120 and the housing 102. In the illustrated embodiment, the bearing liner 110 can be formed from Kovar, Inconel, nickel-cobalt alloys, etc. In the illustrated embodiment, the bearing liner 110 can provide a thermal expansion coefficient of approximately $5*10^{-6}$ meters/(meters*Kelvin) between 30 degrees Celsius and 200 degrees Celsius.

Referring to FIG. 2, in the illustrated embodiment, the bearing internal clearance 130 is the internal operating clearance available for the bearing between the housing 102 and the interface surface with the rotating shaft 140. In certain embodiments, the interface surface is the contact surface between the rollers 124 and the rotating shaft 140. In other embodiments, the interface surface is the contact surface between the inner race 122 and the rotating shaft 140.

In the illustrated embodiment, the bearing internal clearance 130 can be determined to provide optimal bearing 120 performance and maximize bearing 120 operating life. In the illustrated embodiment, the bearing internal clearance 130 can vary according to expansion of materials within the IDG 100. In the illustrated embodiment, the IDG 100 utilizes dissimilar materials, such as the light alloy housing 102 with a coefficient of thermal expansion that is greater than the coefficient of thermal expansion of the bearing 120. Therefore, during operation and exposure to various temperature ranges the housing 102 and the bearing 120 may expand at different rates.

During operation, the IDG 100 may experience a wide range of temperatures due to environmental conditions, operating conditions, etc. In the illustrated embodiment, the bearing liner 110 allows for the expansion of the housing 102 and the bearing 120 at different rates while maintaining the bearing internal clearance 130 within the desired range across a wide temperature range.

In the illustrated embodiment, the bearing liner 110 has a lower coefficient of thermal expansion than both the bearing 120 and the housing 102. Therefore, as the IDG 100 is exposed to increasing temperatures, the bearing liner 110 expands at a slower rate than the bearing 120, constraining the thermal expansion of the bearing 120. In the illustrated embodiment, the coefficient of thermal expansion of the bearing liner 110 is selected to be complimentary to the coefficient of thermal expansion of the housing 102 to maintain the bearing internal clearance 130 within a desired range across a wide temperature range. In certain embodiments, the geometry of the bearing liner 110 can be selected to provide a thermal expansion rate that is complimentary to the thermal expansion rate of the housing 102. In the illustrated embodiment, the rate of expansion of the housing 102 and the lower rate of the expansion of the bearing liner 110 maintain the bearing internal clearance 130, facilitating the use of dissimilar materials within the IDG 100 over a wide range of temperature to optimize bearing 120 life and performance.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A device with a rotating element, comprising:
a housing body formed from a light alloy, wherein the housing body has a housing body thermal expansion coefficient;
a bearing liner formed from a liner material disposed within the housing body, wherein the bearing liner has a bearing liner thermal expansion coefficient; and
a bearing to support the rotating element with an outer race, wherein:
the bearing has a bearing thermal expansion coefficient, which is lower than the housing body thermal expansion coefficient,
the outer race is press fit within the bearing liner,
the bearing liner thermal expansion coefficient is lower than the bearing thermal expansion coefficient,
a bearing internal clearance is provided between the bearing and the housing body, and
the housing body, the bearing liner and the bearing thermal expansion coefficients are selected to maintain the bearing internal clearance across a bearing operating temperature range.

2. The rotational device of claim 1, wherein the bearing is a roller bearing.

3. The rotational device of claim 1, wherein the bearing is a ball bearing.

4. The rotational device of claim 1, wherein the light alloy is at least one of magnesium and aluminum.

5. The rotational device of claim 1, wherein the liner material is at least one of nickel and cobalt.

6. The rotational device of claim 1, wherein the bearing is formed from steel.

7. The rotational device of claim 1, wherein:
the housing body thermal expansion coefficient is approximately $22.2*10^{-6}$ meters/(meters*Kelvin)–$25*10^{-6}$ meters/(meters*Kelvin),
the bearing thermal expansion coefficient is approximately $9.9*10^{-6}$ meters/(meters*Kelvin)–$17.3*10^{-6}$ meters/(meters*Kelvin), and
the bearing liner thermal expansion coefficient is approximately $5*10^{-6}$ meters/(meters*Kelvin).

8. An integrated drive generator, comprising:
a rotating shaft;
a housing body formed from a light alloy, wherein the housing body has a housing body thermal expansion coefficient;
a bearing liner formed from a liner material disposed within the housing body, wherein the bearing liner has a bearing liner thermal expansion coefficient;
a bearing with an outer race, the bearing to support the rotating shaft, wherein:
the bearing has a bearing thermal expansion coefficient, which is lower than the housing body thermal expansion coefficient,
the outer race is press fit within the bearing liner,
the bearing liner thermal expansion coefficient is lower than the bearing thermal expansion coefficient,
a bearing internal clearance is provided between the bearing and the housing body, and
the housing body, the bearing liner and the bearing thermal expansion coefficients are selected to maintain the bearing internal clearance across a bearing operating temperature range.

9. The integrated drive generator of claim 8, wherein the bearing is a roller bearing.

10. The integrated drive generator of claim 8, wherein the bearing is a ball bearing.

11. The integrated drive generator of claim 8, wherein the light alloy is at least one of magnesium and aluminum.

12. The integrated drive generator of claim 8, wherein the liner material is at least one of nickel and cobalt.

13. The integrated drive generator of claim 8, wherein the bearing is formed from steel.

14. The integrated drive generator of claim 8, wherein:
the housing body thermal expansion coefficient is approximately $22.2*10^{-6}$ meters/(meters*Kelvin)–$25*10^{-6}$ meters/(meters*Kelvin),
the bearing thermal expansion coefficient is approximately $9.9*10^{-6}$ meters/(meters*Kelvin)–$17.3*10^{-6}$ meters/(meters*Kelvin), and
the bearing liner thermal expansion coefficient is approximately $5*10^{-6}$ meters/(meters*Kelvin).

15. A device with a rotating element, comprising:
a housing body formed from a light alloy and having a first coefficient of thermal expansion (CTE);
a bearing having a second CTE, which is lower than the first CTE; and
a bearing liner formed from a liner material disposed within the housing body and having a third CTE, which is lower than the second CTE, wherein:
the bearing comprises an outer race supporting the rotating element and which is press fit within the bearing liner, an inner race interfacing with the rotating element, a bearing retainer interposed between the outer and inner races and rotating elements retained between the bearing retainer and the outer race and between the bearing retainer and the inner race, wherein:
a bearing internal clearance is provided between the bearing and the housing body and is maintained by the housing body, the bearing and the bearing liner with the respective first, second and third CTEs across a bearing operating temperature range.

* * * * *